(12) United States Patent
Mozer et al.

(10) Patent No.: US 6,698,819 B1
(45) Date of Patent: Mar. 2, 2004

(54) PNEUMATIC PRESSURE MOLDED IMPACT COUNTERMEASURE

(75) Inventors: Eric Stefan Mozer, Rochester, MI (US); Alan Dry, Grosse Pointe, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/248,013

(22) Filed: Dec. 10, 2002

(51) Int. Cl.⁷ ............................................. B60R 27/00
(52) U.S. Cl. ............... 296/187.03; 296/214; 296/146.5; 296/70; 180/90
(58) Field of Search ............................. 296/187.03, 214, 296/146.5, 70; 180/90; 188/371, 376, 377; 280/752, 753, 748, 750, 751

(56) References Cited

U.S. PATENT DOCUMENTS

| | | | |
|---|---|---|---|
| 3,814,459 A | 6/1974 | Eckels | 280/150 |
| 4,948,196 A * | 8/1990 | Baba et al. | 296/188 |
| 5,098,124 A | 3/1992 | Breed et al. | 280/751 |
| 5,356,177 A | 10/1994 | Weller | 280/751 |
| 5,382,051 A | 1/1995 | Glance | 280/751 |
| 5,649,721 A | 7/1997 | Stafford et al. | 280/751 |
| 5,715,757 A * | 2/1998 | Dannawi et al. | 296/189 |
| 5,819,408 A | 10/1998 | Catlin | 29/897.2 |
| 5,836,641 A | 11/1998 | Sugamoto et al. | 296/189 |
| 5,884,962 A | 3/1999 | Mattingly et al. | 296/189 |
| 6,017,084 A | 1/2000 | Carroll, III et al. | 296/189 |
| 6,138,429 A * | 10/2000 | Baumgaertner | 296/188 |
| 6,213,540 B1 | 4/2001 | Tusim et al. | 296/189 |
| 6,234,526 B1 | 5/2001 | Song et al. | 280/751 |
| 6,247,745 B1 | 6/2001 | Carroll, III et al. | 296/189 |
| 6,302,477 B1 | 10/2001 | Satou | 296/189 |
| 6,390,538 B1 | 5/2002 | Hashimoto et al. | 296/189 |
| 6,449,942 B1 | 9/2002 | Dean et al. | 60/257 |
| 6,488,312 B2 * | 12/2002 | Knoethig et al. | 296/188 |
| 2002/0017805 A1 | 2/2002 | Carroll, III et al. | 296/189 |
| 2002/0046911 A1 | 4/2002 | Sacks et al. | 188/377 |
| 2002/0070584 A1 | 6/2002 | Carroll, III et al. | 296/189 |

FOREIGN PATENT DOCUMENTS

| | | |
|---|---|---|
| JP | 2000108826 A | 4/2000 |
| JP | 2000142288 A | 5/2000 |
| JP | 2000177518 A | 6/2000 |

* cited by examiner

Primary Examiner—D. Glenn Dayoan
Assistant Examiner—Lori L Coletta
(74) Attorney, Agent, or Firm—Bill C. Panagos

(57) ABSTRACT

An impact countermeasure device (30) used for receiving an impact force (56) has a generally hollow body with an outer wall (52) defining an interior portion (54) and an exterior portion. The wall (52) has at least one blow hole (60) therethrough. The wall (52) has at least one tack off area (70) formed therein. The tack off area (70) and the blow hole (60) control the crush rate of the body in response to the impact force (56).

19 Claims, 3 Drawing Sheets

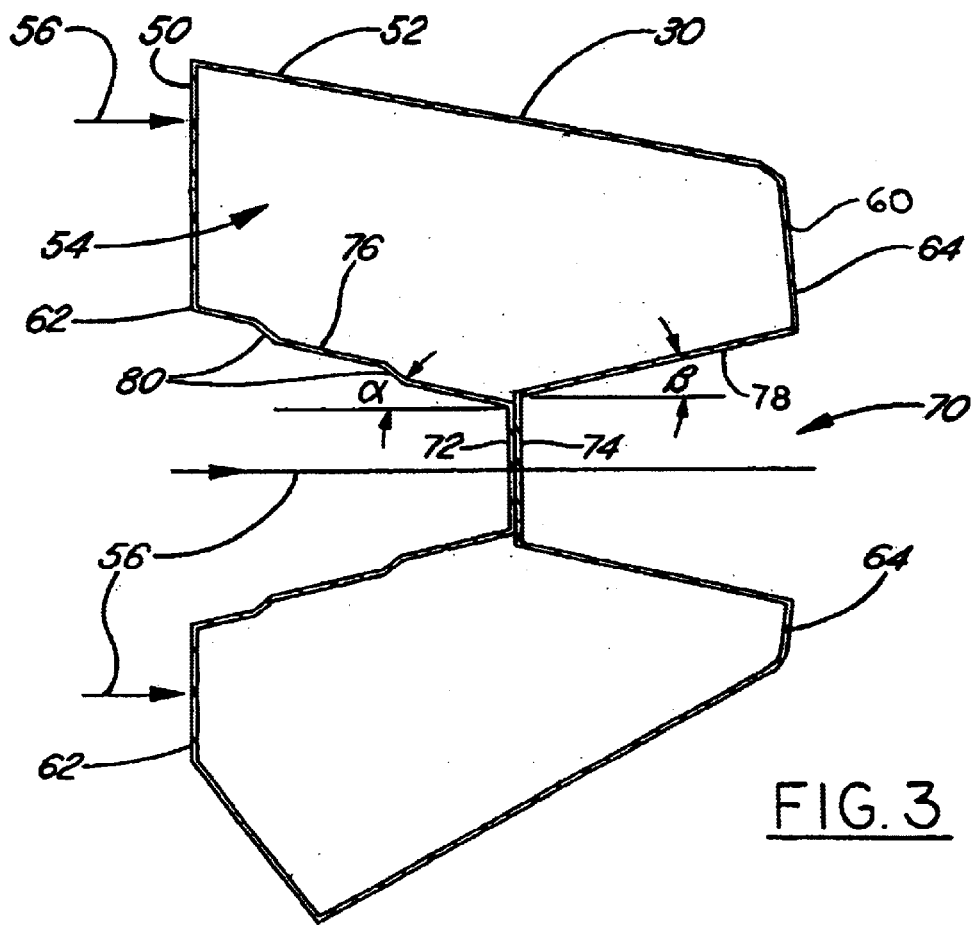
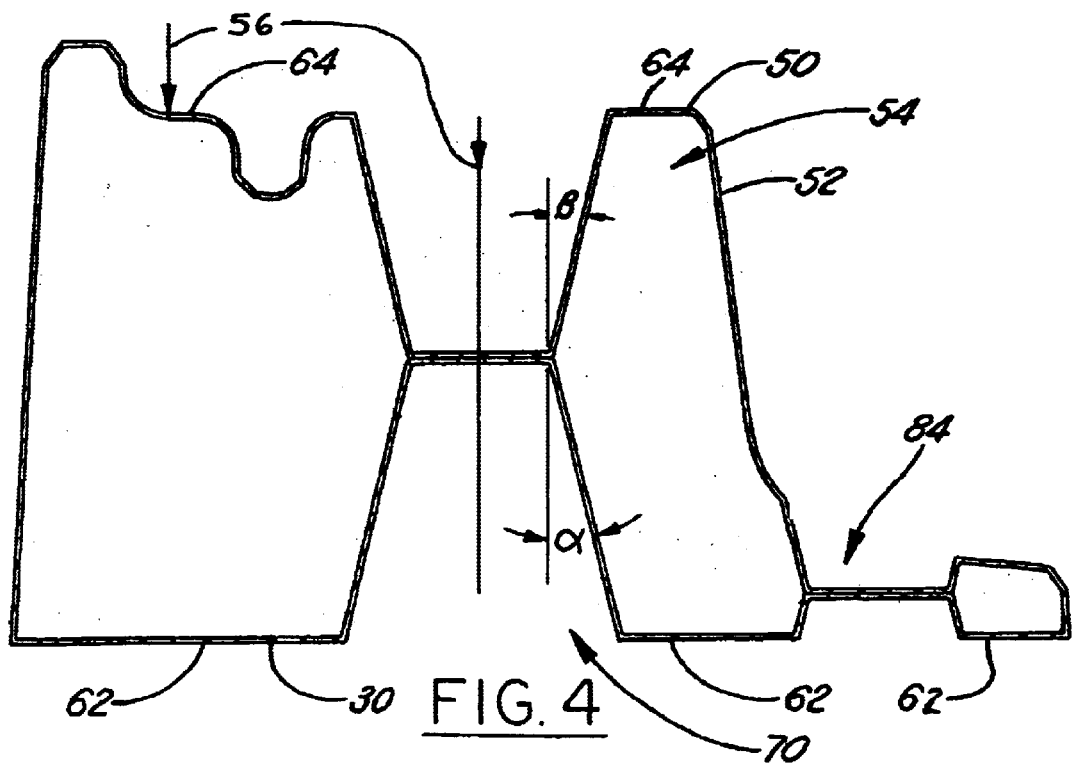

PNEUMATIC PRESSURE MOLDED IMPACT COUNTERMEASURE

BACKGROUND OF INVENTION

The present invention relates generally to impact countermeasures for automotive vehicles, and more particularly, to hollow countermeasures structures used to reduce the force of impact on various portions of the interior of the automotive vehicle.

Resilient pads have been used to protect vehicle occupants from contact with the interior structure of the vehicle during an impact. One common way in which to prevent contact with the interior structure is to provide airbags. Airbags have been employed both in front and in side impact areas. However, airbags do not completely protect the vehicle occupant. Other areas of contact for the vehicle occupants may include the body pillars, roof structure, door header and the like. Commonly, expanded foam pads are employed in such areas. Expanded foam pads are formed of molded and expanded polypropylene or polystyrene foam. Using molded expanded polypropylene or polystyrene foam requires the use of long cycle time processes. Such materials are relatively expensive and the processes are expensive in that they are time consuming to form a part.

Another drawback to such devices is that as the design evolves for a particular automotive vehicle, the parts may have to be substantially reworked during the process.

It would therefore be desirable to provide a method for forming an impact countermeasure that is flexible to allow easy design changes as well as uses low cost materials and low processing times.

SUMMARY OF INVENTION

The present invention provides a countermeasure that uses a blow molding process to form a hollow part.

In one aspect of the invention, a countermeasure for receiving an impact force has a generally hollow device body that has an outer wall defining an interior portion and an exterior portion. The wall has at least one blow hole therethrough. The wall has at least one tack off area formed therein. The tack off area and the blow hole control the crush rate of the body in response to the impact force.

In a further aspect of the invention, a method for operating a countermeasure device comprises directing an impact force at a generally hollow device, counteracting the impact force by releasing air through a blow hole in a predetermined rate in response to the impact, and counteracting the impact by controllably crushing a tack off area.

In a further aspect of the invention, a method for making a countermeasure device comprises blow molding a device having a generally hollow device body having an outer wall defining an interior portion and an exterior portion, forming at least one blow hole through the outer wall, forming at least one tack off area in the outer wall, and achieving a crush rate by sizing the tack off area and said blow hole.

One advantage of the invention is that the blow molding process has a substantially reduced cycle time than the foam processes described in the background of the invention. Another advantage of the invention is that the device is easily tunable for different impacts by controlling the blow hole size. Thus, if the requirements of the vehicle are changed, the blow hole may be easily changed.

Another advantage of the invention is that the angles of the sidewalls of the tack off area may be easily changed or the shape may be changed to change the crushing characteristic of the device without having to change the entire device design.

Other advantages and features of the present invention will become apparent when viewed in light of the detailed description of the preferred embodiment when taken in conjunction with the attached drawings and appended claims.

BRIEF DESCRIPTION OF DRAWINGS

FIG. 3 is a cross-sectional view of a countermeasure device of FIG. 2.

FIG. 4 is a second cross-sectional view of a countermeasure device formed according to the present invention.

DETAILED DESCRIPTION

Figure 1:
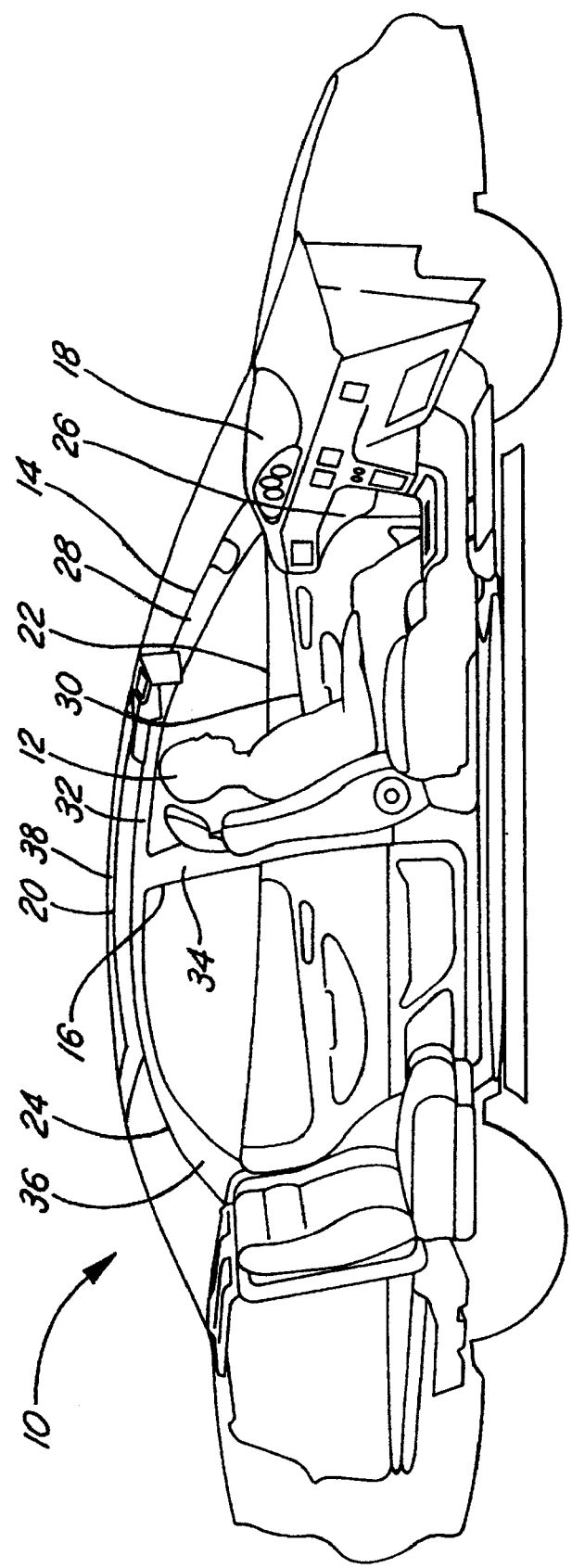
FIG. 1 is a cutaway side view of an automotive vehicle having several devices formed according to the present invention.

In the following figures the same reference numerals will be used to illustrate the same components.

The present invention is described with respect to various implementations of countermeasure devices. However, those skilled in the art will recognize other applications for the implementation of impact countermeasures of the present invention.

Referring now to FIG. 1, an automotive vehicle 10 is shown having a vehicle occupant 12 positioned with respect to an A pillar 14, a B pillar 16, an instrument panel 18, a headliner 20, and a door 22. A C pillar 24 is also illustrated. Devices formed according to the present invention may include a knee bolster device 26 positioned beneath the instrument panel, an A pillar device 28 positioned on A pillar 14 of the present invention, a door device 30 positioned on door 22 of the automotive vehicle, a door header device 32 positioned on the header of door 22 of the automotive vehicle, a B pillar device 34 positioned on the B pillar of the automotive vehicle, a C pillar device 36 positioned on the C pillar 24 of the automotive vehicle, a headliner device 38 positioned on the headliner 20 of the vehicle. Of course, those skilled in the art will recognize that a rear door device may also be included similar to the door device described above. Also, devices formed according to the teachings herein may be located at various other places of the vehicle. For example, in a van or SUV, the D pillar may also have such devices as well as the rear window header or inside the rear quarter panel. Essentially, any place an occupant may contact the vehicle structure may include such a device.

Figure 2:
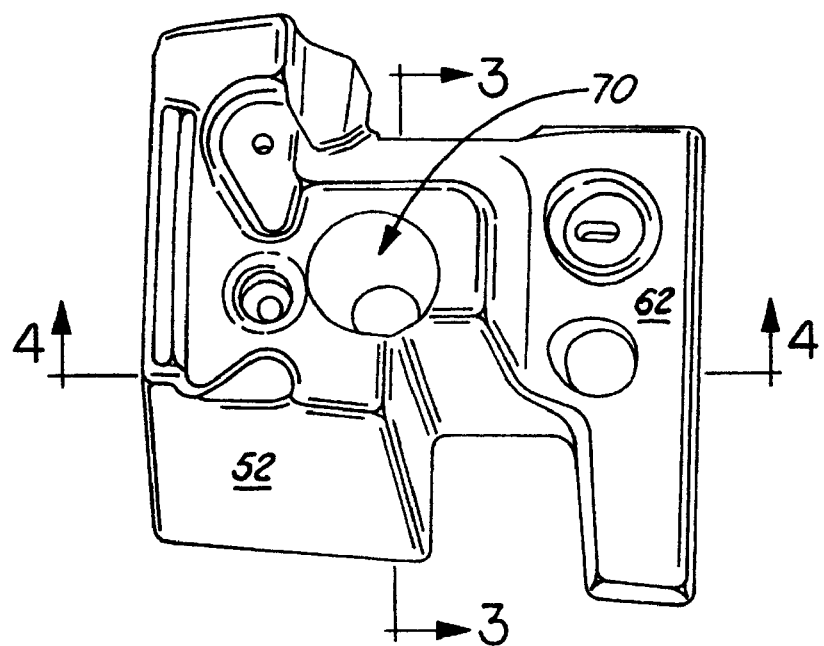
FIG. 2 is a perspective view of a countermeasure device formed according to the present invention.

Referring now to FIGS. 2, 3, and 4, door bolster device 30 is illustrated in further detail. It should be noted that although a door bolster device 30 is illustrated, the teachings of the present invention are equally applicable to any of the other types of devices described above. As can be seen, door device 30 has a generally hollow body 50. The hollow body is defined by an outer wall 52 disposed therearound. Thus, outer wall 52 defines an interior portion 54 and an exterior portion outside of the outer wall 52. As will be further described below, the outer wall 52 are preferably blow molded to form the device 30. The blow molded outer wall 52 allow for the device to absorb energy when crushed by an impact force 56. Generally, the impact force represented by arrows 56 are generally perpendicular to the outer surface of the device 30. As shown, the outer wall 52 of the device may be irregularly shaped, however, the direction of impact for the particular part is generally known. Thus, the device may be designed to dissipate the maximum impact force.

A blow hole 60 through outer wall 52 may be sized to control the crush rate of the device 30. By sizing the blow hole larger, the device will crush at a faster rate than if the hole 60 is smaller.

The device 30 generally has a front wall 62 and a rear wall 64. Front wall 62 and rear wall 64 are oriented relative to the direction of impact 56. That is, front wall 62 receives the impact which, after crushing, the impact tends toward rear wall 64. As the device crushes, the blow hole releases the air therefrom and controls the crush rate thereof.

A tack off area 70 is formed in the device. Tack off area 70 is comprised of a first area 72 of front wall 62 and a second area 74 of rear wall 64 that are positioned directly adjacent to each other. In the preferred embodiment, the first area 72 and the second area 74 are touching each other. The first area 72 and the second area 74 are preferably positioned near the middle of the device. That is, the first area 72 and the second area 74 are preferably positioned somewhere between front wall 62 and rear wall 64. The first area 72 is coupled to front wall 62 by an angular front wall 76. Angular front wall 76 is generally conical in shape and has an angle α relative to the angle of impact. As illustrated, angular front wall 76 is generally conical in cross-section.

An angular rear wall 78 couples second area 74 to rear wall 64. As illustrated, angular rear wall 78 has an angle β with respect to the direction of impact 56. By changing the angles α and β, the crush rate of the entire device may be changed.

As is best shown in FIG. 3, the crush rate may also be changed by providing discontinuities or corrugations 80 in the angular front wall 76. Thus, when looking within the device the discontinuities or corrugations 80 appear as continuous rings of angular front wall 76.

Referring now to FIG. 4, a tack off area 84 is shown. Tack off area 84 is disposed rearwardly from the first tack off area 70. A tack off area 84 may be used for attaching the device to the structure of the vehicle. Thus, tack off area 84 may have a fastener or the like therethrough.

In operation, when the device is subjected to an impact force 56, the impacting force is counteracted in two ways. First, the air is controllably released through one or more blow holes and therefore the crush rate may be controlled thereby. In a second respect, the angles of the tack off walls and the presence or absence of discontinuities changes the crush rate of the device particularly in the area of the device receiving the most impact. That is, as is best shown in FIG. 4, the tack off area 70 along with the blow hole 70 will counteract the most impact for the device.

To form the device the body of the device is preferably blow molded. Portions of the device are tacked off so that the device is not hollow at the tack off areas. By blow molding the device an interior portion and exterior portion are defined. Blow holes may be formed during the blow molding process or formed immediately thereafter by drilling, cutting, or the like. Thus, when a force is imparted upon the device, both the tack off area and the presence and size of the blow hole counteract the force thereby.

While particular embodiments of the invention have been shown and described, numerous variations and alternate embodiments will occur to those skilled in the art. Accordingly, it is intended that the invention be limited only in terms of the appended claims.

What is claimed is:

1. An impact countermeasure device for receiving an impact force having an impact direction comprising:
   a generally hollow device body having an outer wall defining an interior portion and an exterior portion, said outer wall having at least one blow hole therethrough; and
   said outer wall having at least one tack off area formed therein, said tack off area and said blow hole controlling a crush rate of said body in response to the impact force.

2. An impact countermeasure device as recited in claim 1 wherein outer wall having a front wall and a rear wall, said tack off area comprising a first area of said front wall disposed directly adjacent to a second area of said rear wall.

3. An impact countermeasure device as recited in claim 2 wherein said outer wall having a front wall having a first area and a rear wall having a second area, said first area and said second area disposed between said front wall and said rear wall.

4. An impact countermeasure device as recited in claim 3 wherein said tack off area comprises a first angular wall coupled between said first area and said front wall, and a second angular wall coupled between said second area and said rear wall.

5. An impact countermeasure device as recited in claim 4 wherein said first angular wall is disposed at an angle with respect to said direction of impact.

6. An impact countermeasure device as recited in claim 5 wherein said angle is 0 to 45 degrees.

7. An impact countermeasure device as recited in claim 4 wherein said first angular wall is non-linear.

8. An impact countermeasure device as recited in claim 5 wherein said first angular wall is stepped.

9. An impact countermeasure device as recited in claim 4 wherein said second angular wall is non-linear.

10. An impact countermeasure device as recited in claim 9 wherein said second angular wall is stepped.

11. An impact countermeasure device as recited in claim 3 wherein said first area and said second area are disposed generally perpendicular to the impact direction.

12. An impact countermeasure device as recited in claim 1 wherein the device is blow-molded.

13. An impact countermeasure device as recited in claim 1 wherein said body is composed of polypropylene or polyethylene.

14. A headliner comprising:
   an impact countermeasure device comprising a generally hollow device body having an outer wall defining an interior portion and an exterior portion, said outer wall having at least one blow hole therethrough; and
   said outer wall having at least one tack off area formed therein, said tack off area and said blow hole controlling a crush rate of said body in response to the impact force.

15. A door panel comprising:
   an impact countermeasure device comprising a generally hollow device body having an outer wall defining an interior portion and an exterior portion, said outer wall having at least one blow hole therethrough; and
   said outer wall having at least one tack off area formed therein, said tack off area and said blow hole controlling a crush rate of said body in response to the impact force.

16. An instrument panel comprising:
   an impact countermeasure device comprising a generally hollow device body having an outer wall defining an interior portion and an exterior portion, said outer wall having at least one blow hole therethrough; and said outer wall having at least one tack off area formed therein, said tack off area and said blow hole controlling a crush rate of said body in response to the impact force.

17. A knee bolster comprising:

an impact countermeasure device comprising a generally hollow device body having an outer wall defining an interior portion and an exterior portion, said outer wall having at least one blow hole therethrough; and said outer wall having at least one tack off area formed therein, said tack off area and said blow hole controlling a crush rate of said body in response to the impact force.

18. A method of providing an impact countermeasure comprising:

directing an impact force at a generally hollow device;

counteracting the impact force by releasing air through a blow hole in a predetermined rate in response to the impact; and counteracting the impact by controllably crushing a tack off area.

19. A method of providing an impact countermeasure as recited in claim 18 wherein counteracting the impact by controllably crushing angular walls of the tack off area.

\* \* \* \* \*